United States Patent [19]

Hitomi et al.

[11] Patent Number: 5,391,685
[45] Date of Patent: Feb. 21, 1995

[54] PRINTING INK FOR SLIGHTLY ADHERENT PLASTIC BASE, PRINTED MATTER OF SAID BASE, AND METHOD OF PRINTING THE BASE

[75] Inventors: Yosuke Hitomi; Mari Murooka; Fuminori Tokuda, all of Tokyo, Japan

[73] Assignee: TDK Corporation, Tokyo, Japan

[21] Appl. No.: 907,953

[22] Filed: Jul. 2, 1992

[30] Foreign Application Priority Data

Jul. 4, 1991 [JP] Japan ................................ 3-189596
Aug. 11, 1991 [JP] Japan ................................ 3-319647

[51] Int. Cl.⁶ ............................................ C08G 18/04
[52] U.S. Cl. .................................... 528/75; 528/44; 522/120; 522/126; 106/20 B; 523/160
[58] Field of Search ............... 528/75, 44; 522/120, 522/126; 106/20 B; 523/160

[56] References Cited

U.S. PATENT DOCUMENTS 4,264,483 4/1981 Laufer et al. .................. 204/159.15
4,680,368 7/1987 Kamoto et al. ...................... 528/75

FOREIGN PATENT DOCUMENTS 0142331 5/1985 European Pat. Off. .
1014285 7/1987 Japan .

Primary Examiner—John Kight, III
Assistant Examiner—R. Johnson
Attorney, Agent, or Firm—Sprung Horn Kramer & Woods

[57] ABSTRACT

A printing ink for printing slightly adhesive plastic bases, especially polyoxymethylenes and polypropylenes, comprises an ultraviolet-curing ink and an isocyanate compound added thereto. The isocyanate compound is added in an amount of 0.5 to 35 parts by weight per 100 parts by weight of the ultraviolet-curing ink. The invention relates also to printed matter on which given characters, figures, or/and patterns have been printed using such an ultraviolet-curing ink. The invention relates further to a printing method for giving such printed matter. The printing is preceded by a pretreatment selected from among corona discharge, shortwave ultraviolet radiation, and electron radiation.

7 Claims, No Drawings

PRINTING INK FOR SLIGHTLY ADHERENT PLASTIC BASE, PRINTED MATTER OF SAID BASE, AND METHOD OF PRINTING THE BASE

BACKGROUND OF THE INVENTION

The present invention relates to a technology of printing slightly adherent plastic bases, especially polyoxymethylene or polypropylene products. The technology of the invention is applicable, e.g., to the printing of necessary information on shutters, made of polyoxymethylene or polypropylene, for opening and closing the head windows of floppy disks.

Plastic products, such as polyethylene (PE), polypropylene (PP), polyethylene terephthalate (PET), polybutylene terephthalate (PBT), polyoxymethylene (POM=polyacetal), polycarbonate (PC), and acrylonitrile-butadiene-styrene (ABS), are in use over a broad range of applications. Those plastic articles are printed, according to the uses, by a variety of techniques including screen printing, padding, and pad printing.

In the printing of the plastic products, the use of a thermosetting or thermoplastic ink can have adverse effects upon the objects, e.g., by the heat of curing or drying or by the action of the solvent used with the ink. The ink of the thermosetting type takes so much time for curing after the printing that its curing is a major limiting factor for the overall production process. To overcome these difficulties, printing with an ultraviolet-curing ink that completes curing immediately after application is being extensively accepted.

Nevertheless, the ultraviolet-curing ink is deemed practically out of use with the above-mentioned polyoxymethylene and polypropylene products. Those resins are in wide use (e.g., for the shutters to open and close the head windows of floppy disks) owing to their relatively low prices and good physical properties and moldability. However, they are too low in surface activity to produce adequate bond with inks, especially with the ultraviolet-curing ink, for practical use. Where they are to be printed, a thermosetting ink of two-part liquid type (consisting of a principal agent and a curing agent) is used. This combination is not suited for quantity production and makes printing barely possible. In cases when printing with an ultraviolet-curing ink is a necessity, those plastic bases have to be replaced by other materials.

BRIEF SUMMARY OF THE INVENTION

This invention has for its object the achievement of a material improvement in the printing adhesion strength of an ultraviolet-curing ink on products comprising slightly adherent plastic bases, especially bases chosen from among polyoxymethylenes and polypropylenes.

The invention realizes a marked increase in the adhesion strength of an ultraviolet-curing ink with respect to the surface of slightly adhesive plastic bases, especially bases chosen from among polyoxymethylenes and polypropylenes, by adding an isocyanate compound to the ink. Preferably, such selected polyoxymethylene and polypropylene base surfaces are subjected to corona discharge, shortwave ultraviolet radiation, or electron radiation prior to the printing so as to achieve a further improvement in the adhesion strength.

DETAILED DESCRIPTION OF THE INVENTION

The ultraviolet-curing ink to which an isocyanate compound is to be added in conformity with the invention may generally be composed of a photopolymerizable oligomer (prepolymer), photopolymerizable monomer (reactive diluent), photopolymerization initiator, photopolymerization initiation assistant, colorant (e.g., pigment) and other additives. The photopolymerizable oligomer is an oligomer having from one to several vinyl functional groups such as acryloyl groups, which is polymerized by ultraviolet radiation to form a polymer. In the practice of the invention, at least one oligomer selected from among epoxy acrylate, epoxidized oil acrylate, urethane acrylate, unsaturated polyester, polyester acrylate, polyether acrylate, vinyl/acrylate, polyene/thiol, silicon acrylate, polybutadiene, and polystyrylethyl methacrylate may be used. Photopolymerizable monomers often have low molecular weight, low viscosity, and high reactivity and solubility. Under this invention, one or more acrylates chosen from among the monofunctional acrylates (methacrylates) having one acryloyl or methacryloyl group per molecule and polyfunctional acrylates having two or more such groups can be used. The photopolymerization initiator to be chosen may be either of the intramolecular bond cleavage type, so called because the initiator molecules cleave themselves to form radicals, or of the intermolecular hydrogen abstraction type in that the initiator forms a complex with a hydrogen donor and causes intermolecular migration of the hydrogen atoms toward the initiator molecules to form radicals. The photopolymerization initiation assistant is an agent which is not activated itself by ultraviolet radiation but which, when used with a photopolymerization initiator, helps the initiator to speed up the initiation reaction, thus realizing a more efficient curing reaction. As regards ultraviolet-curing compositions, oligomers used as UV and EB are epoxyacrylate, epoxidized oil acrylate, urethane acrylate, unsaturated polyester, polyester acrylate, polyester acrylate, vinyl acrylate, polyene thiol, silicone acrylate, polybutadiene and polystyrylethyl methacrylate. Epoxyacrylate is classified into bisphenol A, S and F types, epoxidized oil type, phenol novolak type and aliphatic ring type. Epoxidized soybean oil is acrylated and the produce contains 3-4 epoxy groups per molecule and the viscosity is 200-300 cps. The ultraviolet-curing resin content in the ultraviolet-curing ink is preferably 20 to 60% by weight.

Useful isocyanate compounds for the present invention are polyisocyanate compounds having two or more isocyanate groups, such as 4,4'-diphenylmethane diisocyanate (MDI), toluylene diisocyanate (TDI), hexamethylene diisocyanate (HDI), isophorone diisocyanate (IPDI), or xylylene diisocyanate (XDI). One or more such compounds may be used at a time.

The amount of such an isocyanate compound or compounds to be added in accordance with the invention is 0.5 to 35 parts by weight, preferably 3 to 25 parts by weight, per 100 parts by weight of an ultraviolet-curing ink. Excessive addition would deteriorate printability and curability. An isocyanate compound content within the range specified above ensures desirable adhesion strength, printability, and curability.

The slightly adherent plastic base, especially the base chosen from among polyoxymethylenes and polypropylenes, may contain some other additives for enhanced adhesion strength, although a 100% polyoxymethylene or polypropylene base is moderately effective.

For use in the present invention the products of slightly adherent plastics, and polyoxymethylene or polypropylene products in particular, may be pre-treated, where necessary, for surface activation, e.g., by corona discharge, shortwave ultraviolet radiation, or electron radiation. The surface activation enhances the adhesion strength. The wettability of the activated surface can be confirmed, e.g., by the use of a wettability index standard solution (made by Wako Pure Chemical Industries, Ltd.) or by measuring the angle of contact with pure water. Although these wettability values vary with the surface roughness, it is desirable under the present invention that, with polyoxymethylene products, the wettability index be about 54 dyne/cm or more and the angle of contact with pure water be 70° or less. With polypropylenes the index is desired to be 37 dyne/cm or upwards.

The invention will be more fully described below in connection with concrete examples thereof.

EXAMPLE 1

Five parts by weight of an isocyanate compound a (an aliphatic HDI compound) was added to 100 parts by weight of an ultraviolet-curing ink A (epoxy acrylate oligomer/polyfunctional acrylate/photopolymerization initiator/color paste/pigment=45/30/3/12/10) and they were thoroughly mixed. A test piece of polyoxymethylene was screen printed with this mixture using a 270-mesh screen under given conditions. On an ultraviolet irradiation apparatus the print was cured by exposure to ultraviolet rays with a wavelength of 365 nm at an intensity of 400 mW/cm$^2$ for two seconds. A sample of cured printed matter was thus obtained.

EXAMPLE 2

Another sample was obtained by following the procedure of Example 1 with the exception that the amount of the isocyanate compound a added was increased to 10 parts by weight.

EXAMPLE 3

Another sample was obtained by the procedure of Example 1 with the exception that 20 parts by weight of the isocyanate compound a was added.

Comparative Example 1

A sample was obtained in the same way as described in Example 1 except that the amount of the isocyanate compound a added was increased to 40 parts by weight.

Comparative Example 2

Another sample was obtained in the manner described in Example 1 except that the isocyanate compound was not added.

EXAMPLE 4

Immediately before printing, the surface of a polyoxymethylene test piece was subjected to corona discharge treatment (600 W and at a test piece speed of 25 m/min during the treatment). With this exception, the procedure of Example 1 was repeated to obtain a sample. The wettability index of the treated surface was about 54 dyne/cm or above. The value before the treatment was about 45 dyne/cm.

EXAMPLE 5

Immediately before printing, the surface of a polyoxymethylene test piece was treated by shortwave ultraviolet radiation (with a wavelength of 254 nm, at 600 mW/cm$^2$, for 3 sec.). Excepting this, the procedure of Example 1 was followed to obtain a sample. The wettability index of the treated surface was at least about 54 dyne/cm.

EXAMPLE 6

Immediately before printing, the surface of a polyoxymethylene test piece was subjected to electron radiation (3 Mrad and at a test piece speed of 50 m/min during the treatment). The rest of the procedure followed was the same as in Example 1, and a sample was obtained. The treated surface gave a wettability index of at least about 54 dyne/cm.

EXAMPLE 7

A sample was obtained by following the same procedure as described in Example 1 with the exception that the ink was replaced by an ultraviolet-curing ink B (polyester acrylate oligomer/polyfunctional methacrylate/photopolymerization initiator/color paste/pigment=50/25/3/12/10).

EXAMPLE 8

The procedure of Example 7 was repeated except for the use of 10 parts by weight of the isocyanate compound a, and a sample was obtained.

EXAMPLE 9

A sample was obtained in the same manner as described in Example 7 except that the amount of the isocyanate compound a was changed to 20 parts by weight.

EXAMPLE 10

In Example 7 the isocyanate compound a was replaced by an isocyanate compound b (a TDI type cyclic trimer compound) and a sample was obtained.

EXAMPLE 11

A sample was obtained by the procedure of Example 7 except that the amount of the isocyanate compound b was changed to 10 parts by weight.

EXAMPLE 12

Another sample was obtained by the procedure of Example 7 except that the amount of the isocyanate compound b was changed to 20 parts by weight.

EXAMPLE 13

A sample was obtained by the procedure of Example 1 except that the ink A was replaced by an ultraviolet-curing ink C (polyester acrylate oligomer 30/polyfunctional methacrylate 37/acrylic resin 16/reaction initiator 5/pigment 3/methylene chloride 5) and the isocyanate compound a was replaced by 20 parts by weight of an (XDI type) isocyanate compound c.

EXAMPLE 14

Immediately before printing, the surface of a polypropylene test piece was treated by corona discharge (600 W and at a test piece speed of 25 m/min during the treatment) and otherwise the same procedure as described in Example 1 was followed to obtain a sample.

The wettability index of the treated surface was about 37 dyne/cm. The value before the treatment was about 31 dyne/cm.

EXAMPLE 15

Immediately before printing, the surface of a polypropylene test piece was treated by shortwave ultraviolet radiation (with a wavelength of 254 nm at 600 mW/cm$^2$ for 3 sec.). Except for this, the procedure of Example 1 was repeated to obtain a sample. The wettability index of the treated surface was about 39 dyne/cm.

EXAMPLE 16

Immediately before printing, the surface of a polypropylene test piece was treated by electron radiation (3 Mrad and at a test piece speed of 50 m/min during the treatment) and otherwise the same procedure as in Example 1 was followed to obtain a sample. The treated surface showed a wettability index of about 40 dyne/cm.

The samples obtained in Examples 1 to 16 and Comparative Examples 1 and 2 were tested for their peel strength with cellophane tape, peel strength by crosscutting, and degree of curing (tacking) after ultraviolet curing. The evaluation results are summarized in Table 1. For the tape peel test, a length of cellophane tape was affixed to the printed portion of each test piece, rubbed well for intimate contact with the latter, and peeled off at a stroke to see if the print too was removed. The criteria were: ○ (not peeled); Δ (slightly peeled); and X (clearly peeled). The crosscut peel test was done by crosscutting the printed portion at intervals of 1 mm crosswise by means of a cutter and then testing in the same way as in the tape peel test. The results were evaluated on the same basis. The both evaluations were made 3 days (72 hours) after the ultraviolet curing. The degree of curing was evaluated by the feel at the fingertips immediately after the ultraviolet curing. The criteria were: ○ (not tacky); Δ (slightly tacky); and X (tacky).

TABLE 1

| | Ink composition | Pre-treat. | Peel test | Cross-cut | Cure deg. |
|---|---|---|---|---|---|
| Example | Ink A/isocyanate compound a | | | | |
| 1 | = 100/5 | no | ○ | Δ | ○ |
| 2 | = 100/10 | " | ○ | Δ | ○ |
| 3 | = 100/20 | " | ○ | ○ | Δ |
| Comp. Ex. | Ink A/isocyanate compound a | | | | |
| 1 | = 100/40 | no | ○ | ○ | X |
| 2 | = 100/0 | " | X | X | ○ |
| Example | Ink A/isocyanate compound a | | | | |
| 4 | = 100/5 | corona* | ○ | ○ | ○ |
| 5 | = 100/5 | UV* | ○ | ○ | ○ |
| 6 | = 100/5 | ER* | ○ | ○ | ○ |
| | Ink B/isocyanate compound a | | | | |
| 7 | = 100/5 | no | ○ | Δ | ○ |
| 8 | = 100/10 | " | ○ | Δ | ○ |
| 9 | = 100/20 | " | ○ | Δ | Δ |
| | Ink B/isocyanate compound b | | | | |
| 10 | = 100/5 | no | ○ | ○ | ○ |
| 11 | = 100/10 | " | ○ | ○ | ○ |
| 12 | = 100/20 | " | ○ | Δ | Δ |
| 13 | Ink C/isocyanate compound c = 100/20 | no | ○ | ○ | ○ |
| | Ink A/isocyanate compound a | | | | |
| 14 | = 100/5 | corona* | ○ | ○ | ○ |
| 15 | = 100/5 | UV* | ○ | ○ | ○ |
| 16 | = 100/5 | ER* | ○ | ○ | ○ |

*corona = corona discharge; UV = ultraviolet radiation; ER = electron radiation

It will be clearly understood from the table that the ultraviolet-curing ink to which an isocyanate has been added shows by far the greater adhesion strength than the isocyanate-free ink. The strength is further enhanced by a pretreatment such as corona discharge treatment. If the isocyanate content is excessive, complete cure will not take place.

As described above, the ultraviolet-curing inks according to the present invention make possible satisfactory printing of slightly adhesive plastic products, such as polyoxymethylene and polypropylene articles. The use of such inks enhances quantity productivity, averts the difficulties with conventional thermosetting inks, and renders it possible to take the full advantage of the outstanding properties of polyoxymethylene and polypropylene products.

What is claimed is:

1. In an ultraviolet-curing printing ink for printing slightly adhesive plastic bases selected from the group consisting of polyoxymethylenes and polypropylenes, which ultraviolet-curing ink is selected from a mixture of at least one oligomer selected from the group of epoxy acrylate, epoxidized oil acrylate, urethane acrylate, unsaturated polyester, polyester acrylate, polyether acrylate, polyene/thiol, polybutadiene or and at least one monomer selected from the group of monofunctional acrylate, monofunctional methacrylate, polyfunctional acrylate or polyfunctional methacrylate, the improvement which comprises including in said ultraviolet-curing ink an isocyanate compound not containing an acrylic group.

2. A printing ink according to claim 1 wherein said isocyanate compound is added in an amount of 0.5 to 35 parts by weight per 100 parts by weight of said ultraviolet-curing ink.

3. A slightly adhesive plastic base selected from the group consisting of polyoxymethylene and polypropylene on which given characters, figures, or/and patterns have been printed using a printing ink according to claim 1 or 2.

4. A slightly adhesive plastic base according to claim 3 which is subjected, before the printing, to a pretreatment selected from among corona discharge, shortwave ultraviolet radiation, and electron radiation.

5. A printing method which comprises printing onto a slightly adhesive plastic base selected from the group consisting of polyoxymethylene and polypropylene which comprises given characters, figures or/and patterns using a printing ink according to claim 1 or 3.

6. A printing method according to claim 5 wherein the printing is preceded by a pretreatment selected from among corona discharge, shortwave ultraviolet radiation, or electronic radiation.

7. A printing ink according to claim 1, wherein said oligomer is selected from the group of epoxy acrylate or polyester acrylate and said monomer is selected from the group of polyfunctional acrylate or polyfunctional methacrylate.

* * * * *

UNITED STATES PATENT AND TRADEMARK OFFICE
CERTIFICATE OF CORRECTION

PATENT NO. : 5,391,685
DATED : February 21, 1995
INVENTOR(S) : Hitomi, et al.

It is certified that error appears in the above-identified patent and that said Letters Patent is hereby corrected as shown below:

Title Page   [30] Foreign Application Priority Data:  Delete
             " Aug. 11, 1991 " and substitute -- Nov. 8, 1991 --

Title Page   U.S. PATENT DOCUMENTS:  After " 9/1987 " delete
             " Kamoto " and substitute -- Nakamoto --

Signed and Sealed this

Thirtieth Day of May, 1995

*Attest:*

*Attesting Officer*

BRUCE LEHMAN
*Commissioner of Patents and Trademarks*